United States Patent
Jain et al.

(10) Patent No.: US 10,341,445 B2
(45) Date of Patent: Jul. 2, 2019

(54) IDENTIFYING MEMBERS THAT INCREASE ENGAGEMENT

(71) Applicant: Microsoft Technology Licensing, LLC., Redmond, WA (US)

(72) Inventors: Aastha Jain, Sunnyvale, CA (US); Shaunak Chatterjee, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 193 days.

(21) Appl. No.: 15/223,207

(22) Filed: Jul. 29, 2016

(65) Prior Publication Data

US 2018/0034927 A1    Feb. 1, 2018

(51) Int. Cl.
*G06N 20/00* (2019.01)
*H04L 12/58* (2006.01)
*H04L 29/08* (2006.01)

(52) U.S. Cl.
CPC .............. *H04L 67/22* (2013.01); *G06N 20/00* (2019.01); *H04L 51/32* (2013.01); *H04L 67/306* (2013.01)

(58) Field of Classification Search
CPC ....... H04L 67/22; H04L 67/306; H04L 51/32; G06N 99/005
See application file for complete search history.

(56) References Cited

U.S. PATENT DOCUMENTS

| 8,943,133 B2 * | 1/2015 | McCaffrey .............. H04L 67/22 709/206 |
| 9,558,266 B1 * | 1/2017 | Diepenbrock, IV ......... G06F 17/30713 |
| 9,639,608 B2 * | 5/2017 | Freeman ................. H04W 4/21 |
| 9,697,016 B2 * | 7/2017 | Jacob .................. G06F 9/44505 |

* cited by examiner

*Primary Examiner* — Nam T Tran
(74) *Attorney, Agent, or Firm* — Schwegman Lundberg & Woessner, P.A.

(57) ABSTRACT

This disclosure relates to systems and methods for identifying members that increase engagement at an online social network. In one example, a method includes retrieving network connectivity and member interaction data for members of an online social networking service that includes a plurality of explicit social networks, building statistical correlations between properties of the respective explicit social networks and interactions between members of the respective explicit social networks, and ranking a set of potential new members for one of the explicit social networks according to the statistical correlations and a statistical likelihood that the new members will increase member interactions with the explicit social network.

20 Claims, 5 Drawing Sheets

IDENTIFYING MEMBERS THAT INCREASE ENGAGEMENT

TECHNICAL FIELD

The subject matter disclosed herein generally relates to online social networking and, more particularly, to identifying members to add to an explicit social network at an online social networking service in order to increase engagement.

BACKGROUND

As more and more people join explicit social networks that are part of an online social networking service, member engagement for members may increase or decrease. In some examples, an explicit social network (e.g., a social network for a specific member of an online social networking service) includes fewer than 10 members. In this example, member engagement may be limited because too few members are active in the explicit social network.

In another example, an explicit social network includes thousands of members. In this example, member engagement may decrease because there is too much content or too many messages causing members of the explicit social network to ignore content.

Some systems attempt to measure member engagement using network structural diversity; however, this attempt fails because expressing aggregate member engagement as a sum of individual engagement does not recognize engagement with internal communities of the network as will be further described.

A potential new member may or may not increase member engagement of an explicit network. Identifying a new member to add to an explicit social network within the online social networking service in order to increase engagement of members of the explicit social network is challenging.

BRIEF DESCRIPTION OF THE DRAWINGS

Some embodiments are illustrated by way of example and not limitation in the figures of the accompanying drawings.

DETAILED DESCRIPTION

The description that follows includes systems, methods, techniques, instruction sequences, and computing machine program products that embody the inventive subject matter. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Example methods and systems are directed to identifying members that increase engagement at an online social networking service. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

As described herein, an explicit social network at least includes one member and each other member of the online social networking service directly connected to that one member. In one example embodiment, an explicit social network excludes members that are only connected to the one member through another member of the online social networking service. In another example embodiment, an explicit social network includes first degree connections and does not include second degree connections.

In one example of an explicit social network, member A is connected to member B, member B is connected to members A and C. In this example, an explicit social network for member A includes members A and B because member A is connected to member B without going through another member. Member C is not part of member A's explicit social network because there is no direct connection between member A and member C that does not go through another member.

In one example embodiment, a system retrieves network connectivity and member interaction data for members of an online social networking service that includes a plurality of explicit social networks. In one example embodiment, network connectivity includes how members of an explicit social network are connected to each other. In one example of an explicit social network, a member is connected to many other members, however, none of the other members are connected to each other. In another example, each member of the explicit social network are connected to each other. Of course, the members of an explicit social network may be connected to each other in many different ways and this information is captured in network connectivity data.

In this example embodiment, the online social networking service includes many explicit social networks because each member may be connected to other members. Therefore, in some embodiments, each member and his/her direct connections to other members defines an explicit social network for the member. In one example, because each member of the online social networking service may directly connect with other members, the online social networking service includes an explicit social network for each member and therefore may include a plurality of explicit social networks.

In one example, the system retrieves the data from a database of members. In another example, the system receives the data from remote systems configured to collect member data and transmit the member data to the system.

In another example embodiment, the system builds statistical correlations between properties of the respective explicit social networks and interactions between members of the respective explicit social networks. In one example embodiment, the system compares the properties of the respective explicit social networks with an amount of member interactions within the respective explicit social networks.

In one example embodiment, the system ranks a set of potential new members for one of the explicit social networks according to the statistical correlations and a statistical likelihood that the new members will increase member interactions within the explicit social network. In another example embodiment, the system recommends to a member of an explicit social network to invite a highest ranked potential new member. In one example embodiment, the system trains a machine learning system that learns the statistical correlations.

In another example embodiment, the system builds statistical correlations using explicit social networks that are of a similar size and include a similar number of member interactions. In one example, networks that are of a similar size include networks with a size within 10% of each other. In another example, networks that include a similar number of member interactions include networks with member interactions that are within 5% of each other. Of course, other values may be used and this disclosure is not limited in this regard.

In one example embodiment, the system measures member interactions on a per unit time basis. For example, the system may measure member interactions daily, weekly, hourly, monthly, or the like.

In another example embodiment, potential new members are limited to members that exceed a threshold number of interactions with the online social networking service 100. In one example, potential new members are limited to members that interact with the online social networking system at least 100 times per month.

In one example embodiment, properties of explicit social networks include a number of network connections, a number of member interactions, a network density, a number of connections with other explicit social networks, a number of communities within the explicit social network, a variance in community size, and a ratio of the number of member interactions to the number of network connections, or other properties described herein. In another example embodiment, properties of the explicit social network include an average visit frequency of members of the explicit social network.

Figure 1:
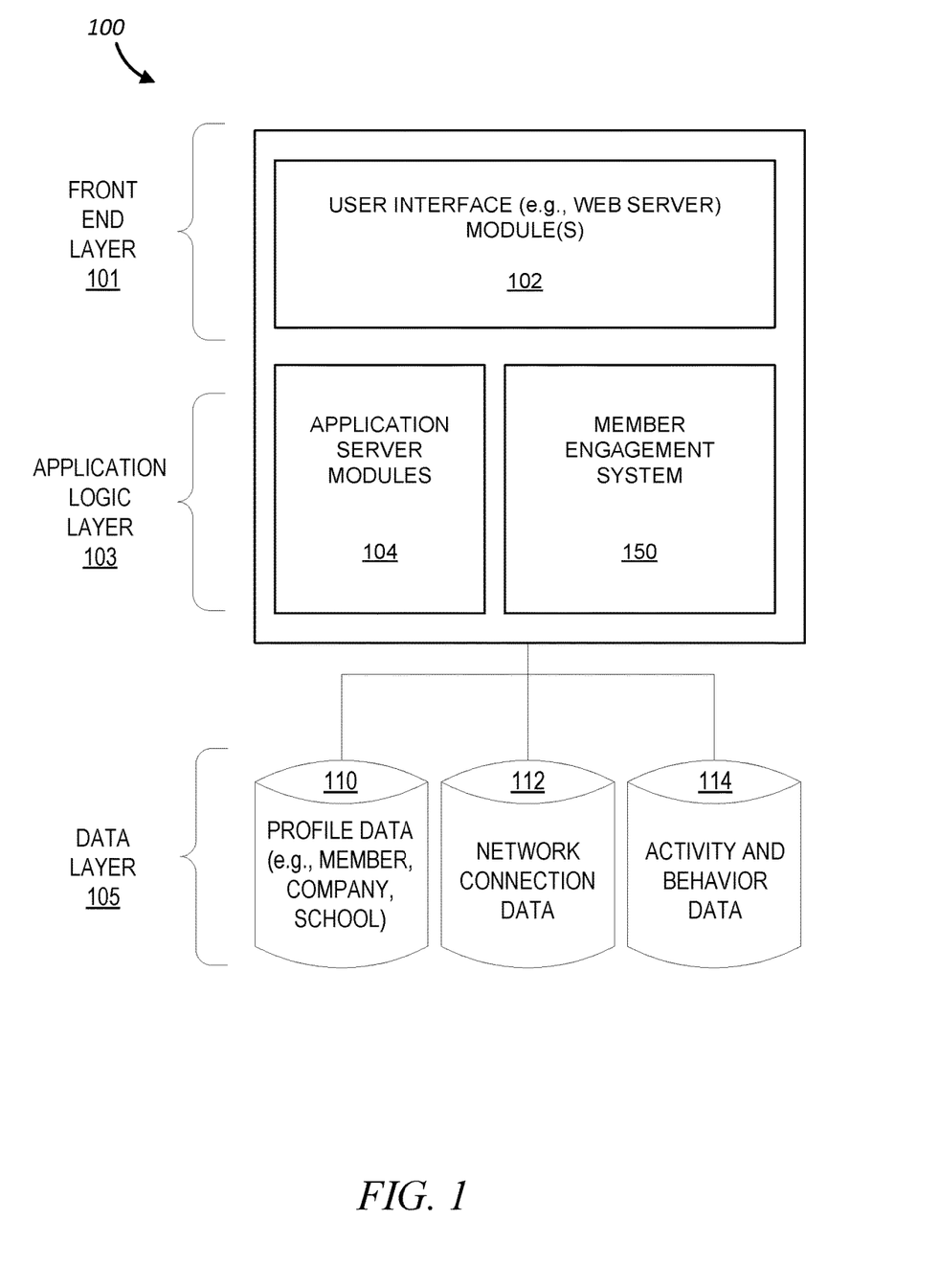
FIG. 1 is a block diagram illustrating various components or functional modules of an online social networking service, in an example embodiment.

FIG. 1 is a block diagram illustrating various components or functional modules of an online social networking service 100, in an example embodiment. The online social networking service 100 may recommend new members for an explicit social network. In one example, the online social networking service 100 includes a member engagement system 150 that performs many of the operations described herein.

A front end layer 101 consists of one or more user interface modules (e.g., a web server) 102, which receive requests from various client computing devices and communicate appropriate responses to the requesting client devices. For example, the user interface module(s) 102 may receive requests in the form of Hypertext Transfer Protocol (HTTP) requests, or other web-based, application programming interface (API) requests. In another example, the front end layer 101 receives requests from an application executing via a member's mobile computing device. In one example embodiment, the user interface module(s) 102 tracks member interactions with the online social networking service 100. In one example, the member interactions include visits to a web page and/or viewing a media content object received from a feed. In other embodiments, member interactions include liking, sharing, clicking on content, commenting on something, or any other feed activity. Of course, one skilled in the art may recognize other ways in which a member may interact with the online social networking system 100 and this disclosure is meant to include all such ways.

An application logic layer 103 includes various application server modules 104, which, in conjunction with the user interface module(s) 102, may generate various user interfaces (e.g., web pages, applications, etc.) with data retrieved from various data sources in a data layer 105. In one example embodiment, the application logic layer 103 includes the member engagement system 150, which retrieves network connectivity and member interaction data, builds statistical correlations between properties of explicit social networks and member interactions within the explicit social networks, and ranks a set of potential new members for an explicit social network according to how those potential new members will affect member engagement. In this way, the member engagement system 150 may restrict invitations to potential new members that will likely increase member engagement. The system may also inform a member that certain potential new members will likely not increase member engagement.

In some examples, individual application server modules 104 may be used to implement the functionality associated with various services and features of the online social networking service 100. For instance, the ability of an organization to establish a presence in the social graph of the online social networking service 100, including the ability to establish a customized web page on behalf of an organization, and to publish messages or status updates on behalf of an organization, may be services implemented in independent application server modules 104. Similarly, a variety of other applications or services that are made available to members of the online social networking service 100 may be embodied in their own application server modules 104. Alternatively, various applications may be embodied in a single application server module 104.

As illustrated, the data layer 105 includes, but is not necessarily limited to, several databases 110, 112, 114, such as a database 110 for storing profile data, including both member profile data and profile data for various organizations. In certain examples, the user interface modules 102 are configured to monitor network connections between members of the online social networking service 100 and store the connections in the network connection data database 112. In another example embodiment, the user interface modules 102 are configured to monitor and store member interactions with the online social networking service 100 and store member engagement in the activity and behavior data database 114. In one example embodiment, the member engagement system 150 retrieves network connection data from the database 112 and member interaction data from the database 114.

Consistent with some examples, when a person initially registers to become a member of the online social networking service 100, the person may be prompted to provide some personal information, such as his or her name, age (e.g., birthdate), gender, sexual orientation, interests, hobbies, contact information, home town, address, spouse's and/or family members' names, educational background (e.g., schools, majors, matriculation and/or graduation dates, etc.), occupation, employment history, skills, religion, professional organizations, and other properties and/or characteristics of the member. This information is stored, for example, in the database 110. Similarly, when a representative of an organization initially registers the organization with the online social networking service 100, the representative may be prompted to provide certain information about the organization. This information may be stored, for example, in the database 110, or another database (not shown).

The online social networking service 100 may provide a broad range of other applications and services that allow members the opportunity to share and receive information, often customized to the interests of the member. For example, in some examples, the online social networking service 100 may include a message sharing application that allows members to upload and share messages with other members. In some examples, members may be able to self-organize into groups, or interest groups, organized around subject matter or a topic of interest. In some examples, the online social networking service 100 may host various job listings providing details of job openings within various organizations.

As members interact with the various applications, services, and content made available via the online social networking service 100, information concerning content items interacted with, such as by viewing, playing, and the like, may be monitored, and information concerning the interactions may be stored, for example, as indicated in FIG. 1 by the database 114. In one example embodiment, the interactions are in response to receiving a message requesting the interactions.

Although not shown, in some examples, the online social networking service 100 provides an API module via which third-party applications can access various services and data provided by the online social networking service 100. For example, using an API, a third-party application may provide a user interface and logic that enables the member to submit and/or configure a set of rules used by the member engagement system 150. Such third-party applications may be browser-based applications, or may be operating system specific. In particular, some third-party applications may reside and execute on one or more mobile devices (e.g., phones or tablet computing devices) having a mobile operating system.

Figure 2:
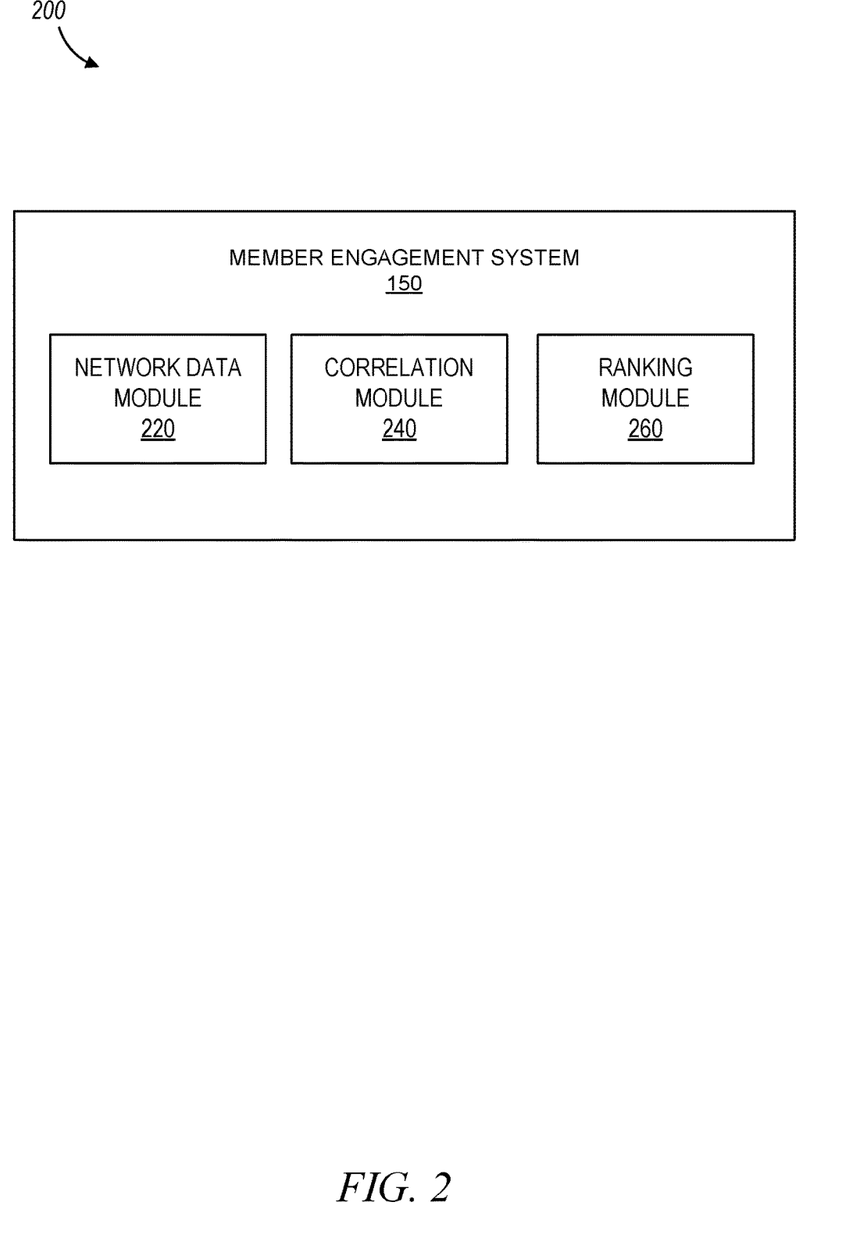
FIG. 2 is a block diagram illustrating a system for identifying members that increase engagement, according to one example embodiment.

FIG. 2 is a block diagram illustrating a system 200 for identifying members that increase engagement, according to one example embodiment. In one example embodiment, the system 200 includes the member engagement system 150. In another example embodiment, the member engagement system 150 includes a network data module 220, a correlation module 240, and a ranking module 260.

In one example embodiment, the network data module 220 is configured to retrieve network connectivity and member interaction data for members of an online social networking service (e.g., online social networking service 100). In one example, the network data module 220 retrieves network connectivity data from the database 112. In another example, the network data module 220 retrieves network connectivity data by retrieving, for a given member, each other member the member is connected to. Of course, one skilled in the art may recognize other ways to retrieve network connectivity data and this disclosure is not limited in this regard.

In one example embodiment, member connectivity data comprises network connections between members of the online social networking service 100. In certain examples, member connectivity includes connections to other members, connections to communities within the online social networking service 100, connection duration, connection strength, or other properties of a connection.

As described herein, a "member" of the online social networking service 100 includes accounts at the online social networking service 100 that represent individual persons as well as accounts that represent other entities, such as, but not limited to, corporations, businesses, interest groups, clubs, families, or other entities, as one skilled in the art may appreciate. In one example, the online social networking service 100 may include a "community" of members. In one example, a community includes a group of members. Accordingly, a member may connect to a community and his/her explicit social network may include each other member that is part of that community.

In one example embodiment, the network data module 220 retrieves member interaction data for members of the online social networking service 100. In one example, the network data module 220 retrieves member interaction data from the database 114 by submitting a query to the database 114 and receiving a response. In another example, the network data module 220 retrieves member interaction data from a user interface module 102 as members interact with the online social networking service 100 using a user interface. Of course, one skilled in the art may recognize other ways in which the network data module 220 may retrieve member interaction data and this disclosure is not limited in this regard.

In one example, the online social networking service 100 includes a plurality of explicit social networks. For example, each member may be directly connected to other members, groups, or other entities defined within the online social networking service 100. In one example embodiment, an explicit social network includes a member and each other entity the member is directly connected to. In this way, a member configures his/her explicit social network by connecting to other members or entities that are part of the online social networking service 100.

In one example embodiment, the network data module 220 retrieves member connectivity data and member interaction data for a set of explicit social networks that are of a similar size and having a similar number of member interactions per unit time. In one example, the network data module 220 retrieves member connectivity data for explicit social networks that are between 180 and 220 members. Of course, other numerical ranges may be used and this disclosure is not limited in this regard.

In another example embodiment, the network data module 220 retrieves member interaction data for explicit social networks that include a certain range of member interactions. In one example, the network data module 220 retrieves member interaction data that is between 5,000 and 8,000 member interactions on a monthly basis. Of course, other numerical ranges may be used and this disclosure is not limited in this regard. In one example embodiment, the network data module 220 retrieves member interactions in a per unit time basis. For example, the network data module 220 may retrieve member interaction per day, week, month, year, or the like.

By limiting the explicit social networks to those that are of a similar size and similar member engagement level, the member engagement system 150 can learn which other factors/properties affect member engagement as described herein.

In one example embodiment, the properties of the explicit social networks include a number of network connections, a number of member interactions, a network density, a number of connections with other explicit social networks, a number of communities within the explicit social network, a variance in community size, and a ratio of the number of member interactions to the number of network connections.

In one example embodiment, network density refers to a ratio of a number of connections for members of an explicit social network to the number of members in the explicit social network. Density increases as the members in an explicit social network are more directly connected with each other. In one example, a community is part of an explicit social network in response to the member that defines the explicit social network being directly connected with the community. In another example, a variance in community size means a maximum difference in size between communities that are connected to the explicit social network.

In one example embodiment, the correlation module 240 is configured to build statistical correlations between properties of the respective explicit social networks and interactions between members of the respective explicit social networks by comparing the properties of the respective explicit social networks with an amount of member interactions within the respective explicit social networks.

In another example embodiment, the correlation module 240 applies a machine learning system that learns the statistical correlations. For example, in one embodiment, the correlation module 240 trains a neural network using explicit social network connection data and member interactions in an explicit social network. As the neural network trains using current explicit social network data, the neural network learns the statistical correlations between properties of an explicit social network and member engagement at the explicit social network.

In one example, each of the properties of an explicit social network and properties of a potential new member are configured as inputs to the neural network. As the neural network trains on the current explicit social networks, the neural network is configured to output a probability that the potential new member will increase member engagement at the explicit neural network. This is one way in which the correlation module 240 learns statistical correlations described herein.

For example, a machine learning system is trained using current explicit social networks. In this example embodiment, the machine learning system trains on each property of the current explicit social networks. Various properties of the explicit social networks are discussed throughout this specification.

In one example, multiple explicit social networks are of a similar size and density. As the machine learning system trains on these explicit social networks the machine learning system learns how other properties of the explicit social networks affects member engagement in those explicit social networks. In one example, a higher percentage of the explicit social networks that have a lower variance in community size exhibit increased member engagement. In this example, the machine learning system learns that lower community size variance increases member engagement for similarly sized explicit social networks.

In another example, the machine learning systems learns that a combination of explicit network size and a ratio of the number of member interactions to the number of network connections decreases member engagement because explicit social network that exhibit those properties demonstrate decreased member engagement. In this example, the member engagement system 150 does not recommend to add additional members in response to those additional members increasing the ratio. As the machine learning system trains on member connectivity data and member engagement data, the machine learning system learns how properties of explicit social networks affect member engagement.

As a higher statistical portion of explicit social networks with similar properties exhibit either increased or decreased member engagement, the machine learning system determines whether adding a given member to an explicit social network will either increase or decrease member engagement within the explicit social network, based, at least in part, on the current explicit social networks. In this way, the correlation module 240 learns statistical correlations between properties of an explicit social network and member engagement of members that are part of the explicit social network.

In one example embodiment, the ranking module 260 receives the probabilities that potential new members will increase member engagement at the explicit social network and ranks potential new members according to the probabilities.

In one example embodiment, the ranking module 260 is configured to rank a set of potential new members for one of the explicit social networks according to the statistical correlations and a statistical likelihood that the new members will increase member interactions within the explicit social network.

In another example embodiment, the ranking module 260 ranks a set of potential new members by ordering the potential new members according to how much each potential new member would increase member engagement. In this example embodiment, the ranking module 260 numerically ranks the potential new members.

In one example embodiment, the ranking module 260 recommends to a member of the explicit social network to add the potential new member that would most significantly increase member engagement. In one example embodiment, the recommended member is the highest ranked potential new member. In another example embodiment, the ranking module 260 transmits a message to a member of the explicit social network to invite the highest ranked potential new member.

In another example embodiment, the set of potential new members is limited to members of the online social networking service 100 with a threshold number of interactions. In one example, a threshold number of interactions is 100 and the ranking module 260 restricts potential new members to those with at least 100 interactions with the online social networking service 100 in a recent month. Of course, other values or time periods may be used and this disclosure is not limited in this regard.

Figure 3:
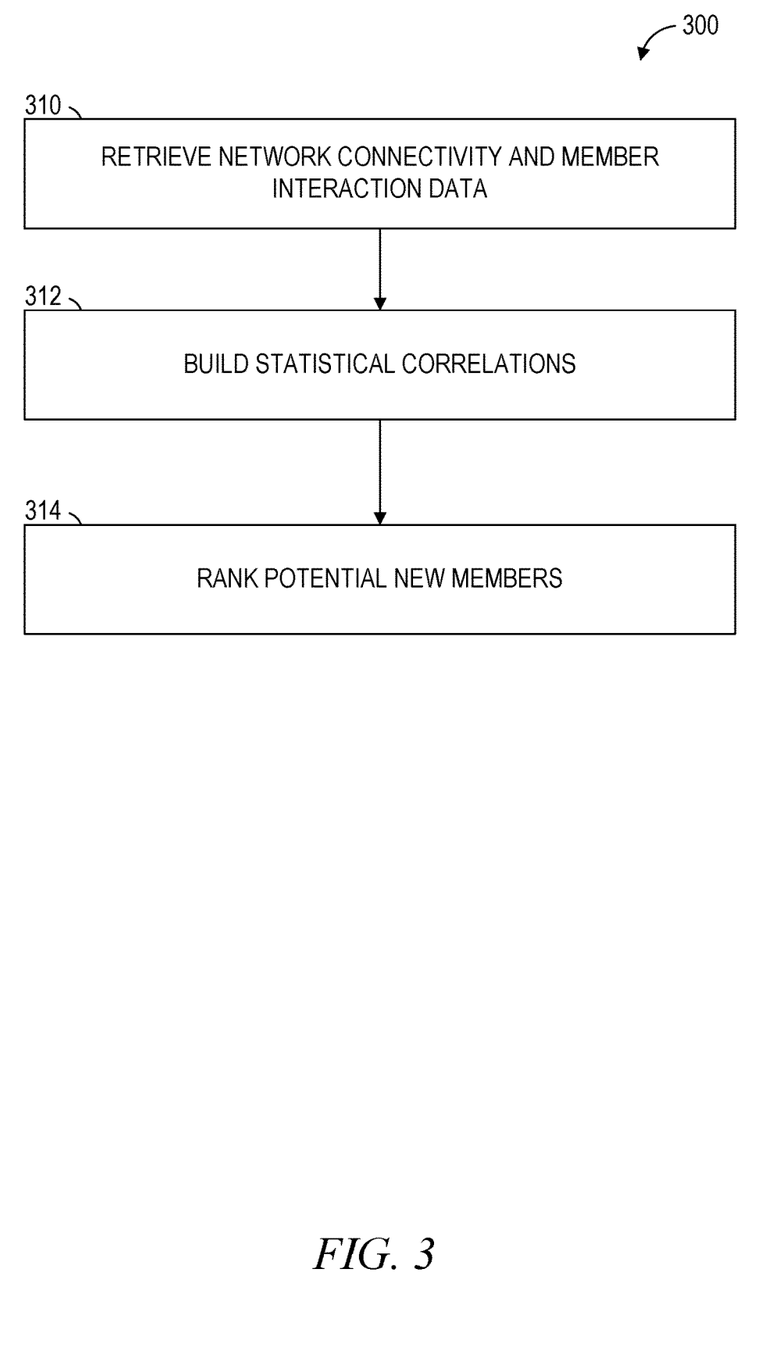
FIG. 3 is a flow chart diagram illustrating a method of identifying members that increase engagement, according to another example embodiment.

FIG. 3 is a flow chart diagram illustrating a method of identifying members that increase engagement. According to one example embodiment, the method 300 is performed by one or more modules of the member engagement system 150 and is described by a way of reference thereto.

In one example embodiment, the method 300 begins and at operation 310 the network data module 220 retrieves network connectivity and member interaction data for members of an online social networking service, e.g., the online social networking service 100. In another example embodiment, the online social networking service 100 includes a plurality of explicit social networks.

The method 300 continues, and at operation 312 the correlation module 240 builds statistical correlations between properties of the respective explicit social networks and interactions between members of the respective explicit social networks. In one example embodiment, the correlation module 240 compares the properties of the respective explicit social networks with an amount of member interactions within the respective explicit social networks. In another example embodiment of the method 300, the explicit social networks have a similar network size and similar member activity. In one example embodiment, at operation 312, the correlation module 240 builds statistical correlations by training a machine learning system that learns the statistical correlations as one skilled in the art may appreciate.

In one example embodiment, similar network activity means members that belong to the explicit social network interact with the online social networking service in similar ways and at similar levels. For example, in similar ways may include the member using a web interface more than 80% of the time. In another example, in similar ways means the members using a mobile application more than 90% of the time to interact with the online social networking service. In another example embodiment, similar network activity means an average number of member interactions per member with the online social networking service 100 is within a threshold percentage.

The method 300 continues at operation 314 and the ranking module 260 ranks a set of potential new members for one of the explicit social networks according to the statistical correlations and a statistical likelihood that the new members will increase member interactions with the explicit social network.

In one example embodiment, the ranking module 260 scores each potential new member according to how the potential new member will impact member engagement of the explicit social network. In one example, the scores are based on the probabilities that the potential new members will increase member engagement. The ranking module 260, in one example embodiment, then ranks the potential new members according to their respective scores.

In one example embodiment, the properties of the explicit social networks include a number of network connections, a number of member interactions, a network density, a number of connections with other explicit social networks, a number of communities within the explicit social network, a variance in community size, and a ratio of the number of member interactions to the number of network connections. Of course, one skilled in the art may recognize other properties of explicit social networks at the online social networking service 100 and this disclosure is meant to include all such properties.

In another example embodiment, an explicit social network includes a specific member of the online social networking service 100 and a number of network connections includes a number of network connections from that member to other members (e.g., entities, individuals, corporations, communities, et al.).

In one example embodiment, a property of an explicit social network includes a number of member interactions within the explicit social network. In one example, as each member of the explicit social network downloads content, interacts with another member, responds to a message, posts content, or performs another action, the network data module 220 counts the interactions. In this way, the network data module 220 may determine a number of member interactions per unit time for an explicit social network.

In another example embodiment, the network data module 220 determines a network density for the explicit social network. In one example, the network data module 220 determines the explicit network density by dividing a total number of network connections in the explicit social network by the total number of members of the explicit social network.

In one example embodiment, the network data module 220 determines a number of connections with other explicit social networks. In one example, the network data module 220 determines the number of connections with other explicit social networks by retrieving data from the network connection data database 112. In another example, the network data module 220 determines a number of connections with other explicit social networks by tracing each network connection that originates within the explicit social network and terminates at a member that is not part of the explicit social network.

In another example embodiment, the network data module 220 determines a number of communities within the explicit social network. In one example, the network data module 220 determines the number of communities within the explicit social network by retrieving data from the network connection data database 112. In another example, the network data module 220 determines a number of communities within the explicit social network by determining which of the members of the explicit social network are defined as a community.

In one example embodiment, the network data module 220 determines a variance in community size for the communities that are part of the explicit social network. In one example, the network data module 220 determines the variance by subtracting a size of the smallest community from a size of the largest community. In another example embodiment, the network data module 220 determines a ratio of the number of member interactions to the number of network connections.

In another example embodiment, the ranking module 260, in operation 314, limits potential new member to those that interact with the online social networking service 100 above a threshold amount. In one example, the threshold amount is a number of interactions per unit time.

In one example embodiment, the member engagement system 150 retrieves network connectivity data from the database 112 and member interaction data from the database 114. The member engagement system 150 then trains a machine learning system using the retrieved data so that the machine learning system takes properties of an explicit social network and a potential new member as inputs and outputs whether the potential new member will increase member engagement for members of the explicit social network.

The member engagement system 150, in one example embodiment, then applies the trained machine learning system to another explicit social network and a set of potential new members to the explicit social network. Based, at least in part, on results of the machine learning system, the member engagement system 150 then ranks the potential new members according to the output of the machine learning system.

Figure 4:
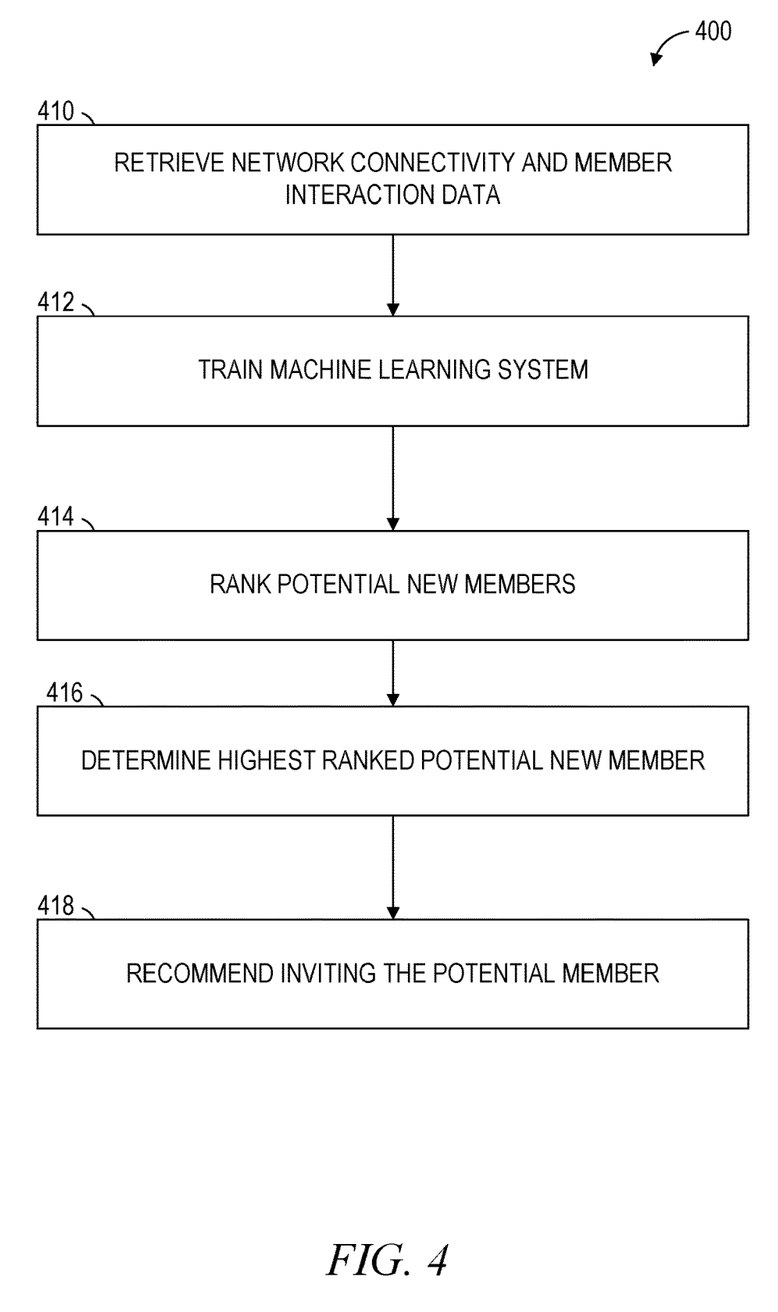
FIG. 4 is a flow chart diagram illustrating another method of identifying members that increase engagement, according to another example embodiment.

FIG. 4 is a flow chart diagram illustrating another method 400 of identifying members that increase engagement, according to another example embodiment. According to one example embodiment, the method 400 is performed by one or more modules of the member engagement system 150 and is described by a way of reference thereto.

In one example embodiment, the method 400 begins and at operation 410 the network data module 220 retrieves network connectivity and member interaction data for members of the online social networking service 100 that includes a plurality of explicit social networks.

The method 400 continues, and at operation 412, the correlation module 240 builds statistical correlations by training a machine learning system using data from currently existing explicit social networks within the online social networking service 100. In one example embodiment, the machine learning system is trained to learn correlations between properties of the respective explicit social networks and interactions between members of the respective explicit social networks. As one skilled in the art may appreciate, a variety of artificially intelligent computing systems may be applied to learn the statistical correlations by training on current explicit social networks and being applied to other explicit social networks.

In another example embodiment of the method 400, the explicit social networks used to train the machine learning system have a similar network size and a similar number of member interactions. By limiting the explicit social networks to those that are similar, the member engagement system 150 learns, based on application of a machine learning system as one skilled in the art may appreciate, which other properties of an explicit social network affect member engagement.

The method 400 continues at operation 414 and the ranking module 260 ranks a set of potential new members for one of the explicit social networks according to the statistical correlations and a statistical likelihood that the new members will increase member interactions with the explicit social network. In one example embodiment, the statistical correlation includes one or more properties of an explicit social network combined with a potential new member correlated with a probability that the potential new member will increase member engagement at the explicit social network.

In another example embodiment, the machine learning system is also configured to include properties of the potential new member as inputs. In certain examples, properties of the potential new member include, but are not limited to, age, gender, race, educational accomplishments, cultural properties, language, professional field, experience level, account age, engagement level (e.g., an amount of interactions over a period of time), a number of connections, a number of community memberships, engagement frequency, engagement purpose, location, location country, a specific service provider associated with the potential new members, or any other property.

By also training on properties of potential new members, the machine learning system learns correlations between explicit social networks and properties of potential new members. Accordingly, the member engagement system 150 identifies potential new members that will likely increase member engagement and may rank the potential new members according to how much the potential new members will likely increase engagement at the explicit social network.

The method 400 continues at operation 416, and the ranking module 260 determines a highest ranked potential new member as described herein. The method 400 continues at operation 418 and the ranking module 260 recommends, to a member of the explicit social network, inviting the highest ranked potential new member.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-4 are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Example Machine Architecture and Machine-Readable Medium

Figure 5:
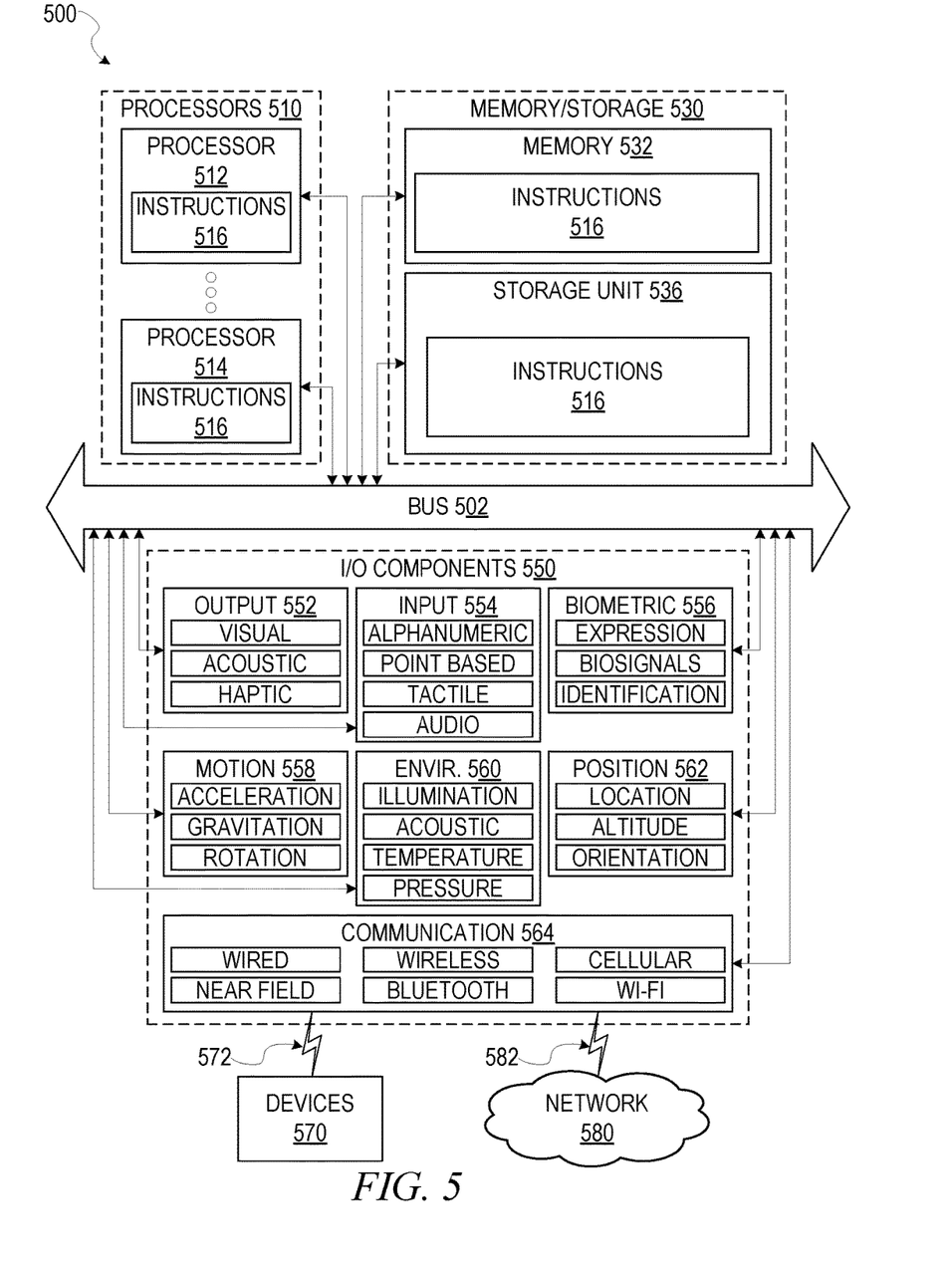
FIG. 5 is a block diagram illustrating components of a machine, according to some example embodiments, able to read instructions from a machine-readable medium (e.g., a machine-readable storage medium) and perform any one or more of the methodologies discussed herein

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example the instructions 516 may cause the machine 500 to execute the flow diagrams of FIGS. 4-6. Additionally, or alternatively, the instructions 516 may implement one or more of the components of FIG. 2. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a personal digital assistant (PDA), or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory/storage 530, and I/O components 550, which may be configured to communicate with each other such as via a bus 502. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 512 and a processor 514 that may execute the instructions 516. The term "processor" is intended to include multi-core processors 510 that may comprise two or more independent processors (sometimes referred to as "cores") that may execute instructions contemporaneously. Although FIG. 5 shows multiple processors, the machine 500 may include a single processor with a single core, a single processor with multiple cores (e.g., a multi-core processor), multiple processors with a single core, multiple processors with multiples cores, or any combination thereof.

The memory/storage 530 may include a memory 532, such as a main memory, or other memory storage, and a storage unit 536, both accessible to the processors 510 such as via the bus 502. The storage unit 536 and memory 532 store the instructions 516 embodying any one or more of the methodologies or functions described herein. The instructions 516 may also reside, completely or partially, within the memory 532, within the storage unit 536, within at least one of the processors 510 (e.g., within the processor's cache memory), or any suitable combination thereof, during execution thereof by the machine 500. Accordingly, the memory 532, the storage unit 536, and the memory of the processors 510 are examples of machine-readable media.

As used herein, "machine-readable medium" means a device able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 516. The term "machine-readable medium" shall also be taken to include any medium, or combination of multiple media, that is capable of storing instructions (e.g., instructions 516) for execution by a machine (e.g., machine 500), such that the instructions, when executed by one or more processors of the machine 500 (e.g., processors 510), cause the machine 500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 550 may include a wide variety of components to receive input, provide output, produce output, transmit information, exchange information, capture measurements, and so on. The specific I/O components 550 that are included in a particular machine 500 will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion and the grouping is in no way limiting. In various example embodiments, the I/O components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562 among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via coupling 582 and coupling 572 respectively. For example, the communication components 564 may include a network interface component or other suitable device to interface with the network 580. In further examples, the communication components 564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a Universal Serial Bus (USB)).

Moreover, the communication components 564 may detect identifiers or include components operable to detect identifiers. For example, the communication components 564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 580 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., HTTP). Similarly, the instructions 516 may be transmitted or received using a transmission medium via the coupling 572 (e.g., a peer-to-peer coupling) to the devices 570. The term "transmission medium" shall be taken to include any intangible medium that is capable of storing, encoding, or carrying the instructions 516 for execution by the machine 500, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   a processor;
   a machine-readable medium having instructions stored thereon, which, when executed by the processor, performs operations comprising:
   retrieving network connectivity and member online interaction data for members of an online social networking service that includes a plurality of explicit social networks;
   building statistical correlations between properties of the respective explicit social networks and online interactions between members of the respective explicit social networks by comparing the properties of the respective explicit social networks with an amount of member interactions within the respective explicit social networks; and
   ranking a set of potential new members for one of the explicit social networks according to the statistical correlations and a statistical likelihood that the potential new members will increase member interactions within the explicit social network;
   wherein the properties of the explicit social networks include at least two of: a number of network connections between members, a number of member interactions, a network density, a number of connections with other explicit social networks, a number of communities within the explicit social networks, a variance in community size, an average visit frequency for members, or a ratio of the number of member interactions to the number of network connections between members.

2. The system of claim 1, wherein the operations further comprise recommending to a member of an explicit social network to invite a highest ranked potential new member.

3. The system of claim 1, wherein building the statistical correlations includes training a machine learning system that learns the statistical correlations.

4. The system of claim 1, wherein the explicit social networks have a similar network size and similar member activity.

5. The system of claim 1, wherein the member interactions are measured in a per unit time basis.

6. The system of claim 1, wherein the potential new members are limited to those that exceed a threshold number of interactions with the social networking service.

7. The system of claim 1, wherein the properties of the explicit social networks include the number of network connections, the number of member interactions, the network density, the number of connections with other explicit social networks, the number of communities within the explicit social networks, the variance in community size, the average visit frequency for members, and the ratio of the number of member interactions to the number of network connections.

8. A method comprising:
- retrieving network connectivity and member online interaction data for members of an online social networking service that includes a plurality of explicit social networks;
- building statistical correlations between properties of the respective explicit social networks and online interactions between members of the respective explicit social networks by comparing the properties of the respective explicit social networks with an amount of member interactions within the respective explicit social networks; and
- ranking a set of potential new members for one of the explicit social networks according to the statistical correlations and a statistical likelihood that the potential new members will increase member interactions with the explicit social network;
- wherein the properties of the explicit social networks include at least two of: a number of network connections between members, a number of member interactions, a network density, a number of connections with other explicit social networks, a number of communities within the explicit social networks, a variance in community size, an average visit frequency for members, or a ratio of the number of member interactions to the number of network connections between members.

9. The method of claim 8, further comprising recommending to a member of an explicit social network to invite a highest ranked potential new member.

10. The method of claim 8, wherein building the statistical correlations includes training a machine learning system that learns the statistical correlations.

11. The method of claim 8, wherein the explicit social networks have a similar network size and a similar member activity.

12. The method of claim 8, wherein the member interactions are measured in a per unit time basis.

13. The method of claim 8, wherein the potential new members are limited to those that exceed a threshold number of interactions with the social networking service.

14. The method of claim 8, wherein the properties of the explicit social networks include the number of network connections, the number of member interactions, the network density, the number of connections with other explicit social networks, the number of communities within the explicit social networks, the variance in community size, and the ratio of the number of member interactions to the number of network connections.

15. A non-transitory machine-readable medium having instructions stored thereon, which, when executed by a processor, cause the processor to perform:
- retrieving network connectivity and member online interaction data for members of an online social networking service that includes a plurality of explicit social networks;
- building statistical correlations between properties of the respective explicit social networks and online interactions between members of the respective explicit social networks by comparing the properties of the respective explicit social networks with an amount of member interactions within the respective explicit social networks; and
- ranking a set of potential new members for one of the explicit social networks according to the statistical correlations and a statistical likelihood that the potential new members will increase member interactions with the explicit social network;
- wherein the properties of the explicit social networks include at least two of: a number of network connections between members, a number of member interactions, a network density, a number of connections with other explicit social networks, a number of communities within the explicit social networks, a valiance in community size, an average visit frequency for members, or a ratio of the number of member interactions to the number of network connections between members.

16. The non-transitory machine-readable medium of claim 15, wherein the operations further comprise recommending to a member of an explicit social network to invite a highest ranked potential new member.

17. The non-transitory machine-readable medium of claim 15, wherein the explicit social networks have a similar network size and similar member activity.

18. The non-transitory machine-readable medium of claim 15, wherein the member interactions are measured in a per unit time basis.

19. The non-transitory machine-readable medium of claim 15, wherein the potential new members are limited to those that exceed a threshold number of interactions with the social networking service.

20. The non-transitory machine-readable medium of claim 15, wherein the properties of the explicit social networks include the number of network connections, the number of member interactions, the network density, the number of connections with other explicit social networks, the number of communities within the explicit social networks, the variance in community size, and the ratio of the number of member interactions to the number of network connections.

* * * * *

UNITED STATES PATENT AND TRADEMARK OFFICE
CERTIFICATE OF CORRECTION

PATENT NO.         : 10,341,445 B2
APPLICATION NO.    : 15/223207
DATED              : July 2, 2019
INVENTOR(S)        : Jain et al.

Page 1 of 1

It is certified that error appears in the above-identified patent and that said Letters Patent is hereby corrected as shown below:

In the Claims

In Column 20, Line 23, in Claim 15, delete "valiance" and insert --variance-- therefor Signed and Sealed this
Seventeenth Day of March, 2020

Andrei Iancu
*Director of the United States Patent and Trademark Office*